March 21, 1961   J. A. DINWIDDIE ET AL   2,976,132
FIXED BED TYPE REACTOR
Filed Feb. 10, 1958
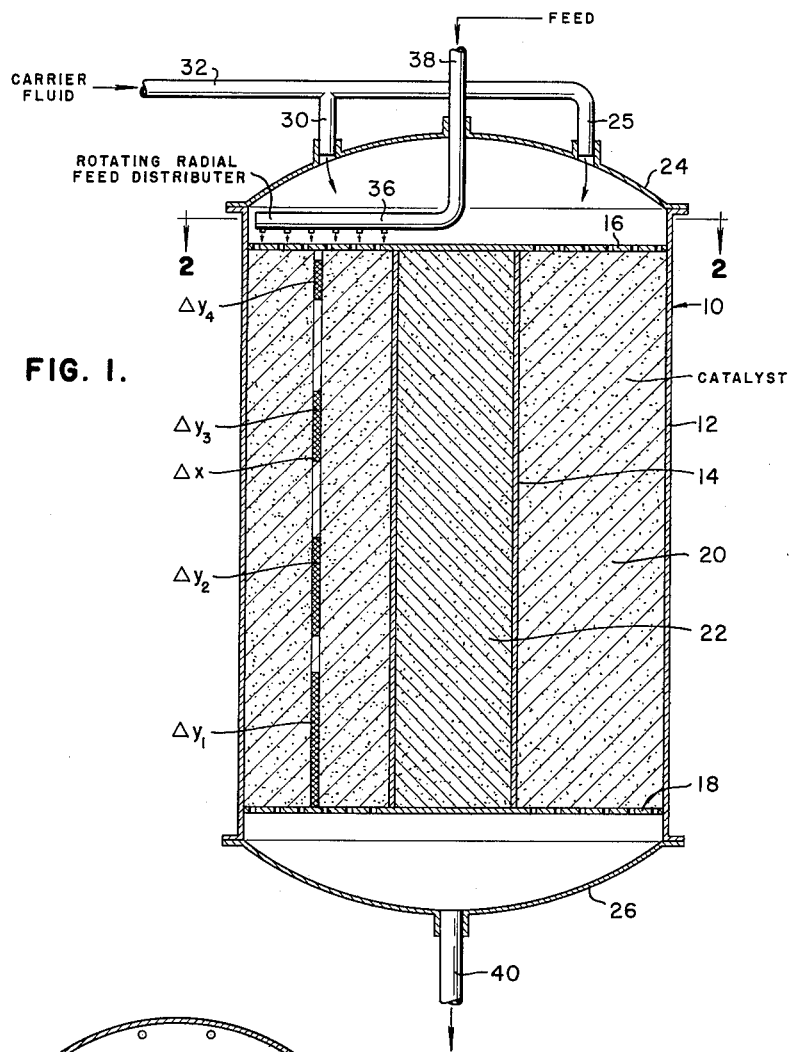
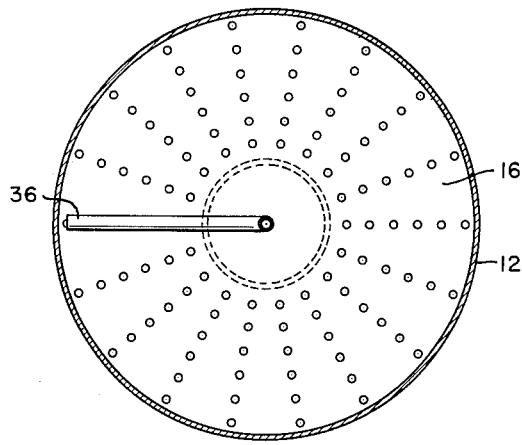
INVENTORS.
JAMES A. DINWIDDIE,
WALTER A. MORGAN,
BY
ATTORNEY

# United States Patent Office 2,976,132
Patented Mar. 21, 1961

2,976,132
FIXED BED TYPE REACTOR

James A. Dinwiddie and Walter A. Morgan, Baytown, Tex., assignors, by mesne assignments, to Esso Research and Engineering Company, Elizabeth, N.J., a corporation of Delaware Filed Feb. 10, 1958, Ser. No. 714,091

3 Claims. (Cl. 23—288)

This invention relates to an improved fixed bed type of reactor for utilization in the catalytic treatment of fluent feed stocks. More particularly, this invention relates to a fixed bed type reactor useful for enhancing the treatment of fluent feed stocks in the presence of finely divided solid conversion catalysts.

In copending Dinwiddie application Serial No. 714,097, filed on an even date therewith and entitled "Catalytic Process," there is disclosed a method for converting fluent feed stocks with improved results by a process sequence wherein a fluent carrier is continually passed through a conversion zone and wherein the feed stock is periodically introduced into the conversion zone in pulses to thereby maintain a constantly changing chemical equilibrium whereby, for a given set of conversion conditions, the effective equilibrium for the treating reaction involved is "shifted to the right."

A problem encountered in conducting an operation of the type in application Serial No. 714,097 is presented by the need of periodically introducing the feed material. This poses a serious problem with respect to processes which are to be conducted on a continuous basis. This and related problems are overcome by the process of the present invention through the provision of an annular reactor wherein the pulse type conversion process may be conducted while continuously introducing both the fluent carrier and the fluent feed material.

Briefly, in accordance with the present invention, there is provided an annular catalyst-containing conversion zone defined by coaxial inner and outer shell members and means are provided for continuously introducing the carrier at one end of the annular conversion zone for continuous flow through all increments of the catalyst bed. A rotatable, radial feed distributor is provided at the feed end of the annular conversion zone for continuously introducing feed material as the feed distributor is rotated whereby reaction components passing through the annular space may be considered as passing therethrough in the form of a spiral flow pattern (i.e., helix). Suitable means are provided at the opposite end of the conversion zone for withdrawing the carrier fluid, conversion products, and unconverted feed material.

The invention will be further illustrated in connection with the accompanying drawing wherein:

Fig. 1 is a side elevational view, in section, illustrating one manner in which a conversion reactor may be constructed in accordance with the present invention; and Fig. 2 is a top plan view of the reactor shown in Fig. 1, taken along the lines 2—2.

Turning now to Fig. 1, there is disclosed a reactor designated generally by the numeral 10 comprising an outer cylindrical shell member 12 and a coaxial inner cylindrical shell member 14. A perforate end plate 16 and a perforate catalyst support plate 18 are provided adjacent opposite ends of the inner shell 14 for supporting the shell 14 within the shell 12. The interior 22 of the inner shell 14 is preferably closed to provide a dead space which is preferably filled with an inert filler material such as sand, bauxite, etc. The annular space 20 intermediate the shell members 12 and 14 constitutes a catalystic conversion zone and is filled with a finely divided, preferably microporous, conversion catalyst. The outer shell member 12 is provided with upper and lower closure members 24 and 26. Suitable means, such as inlet lines 25 and 30 connected with a feed line 32, are provided for continuously supplying a carrier fluid to the conversion zone 20. Rotating means, such as a distributing arm 36 connected with a coaxial feed shaft 38 journaled in the closure member 24 are provided for continuously introducing fluent reactants into the shell 12.

Suitable means, such as an outlet line 40, are provided for withdrawing the carrier fluid and conversion products from the shell 12.

Operation

In conducting catalytic conversion operations in an apparatus of the type shown in Figs. 1 and 2, the annulus 20 is filled with a finely divided, preferably microporous, conversion catalyst. For example, a dehydrogenation catalyst such as a ferric oxide catalyst consisting essentially of 70 to 80 percent $Fe_2O_3$, 3 percent $Cr_2O_3$, and about 17 to 27 percent $K_2CO_3$ potassium carbonate may be employed. The catalyst should preferably be in a finely divided condition having a particle size in the range of about 0.01 to about 0.25 inch (i.e., 3 to 60 mesh). Thus, in this situation, a dehydrogenation reaction will be conducted in the annular conversion zone 20.

In conducting such a dehydrogenation reaction, a carrier fluid inert to the reaction, such as steam, is continuously introduced into the shell 12 by means of the feed lines 25 and 30. As a consequence, the carrier gas will continuously flow through all incremental segments of the conversion zone and will pass therefrom to the outlet line 40. At the same time, the feed shaft 38 is rotated and a suitable feed material, such as a mixture of butylenes, is introduced into the shaft. As a consequence, the rotating feed distributor 36 will cause the butylenes feed stock to pass through the annular conversion zone in a helix path; i.e., the instantaneous positions of all plug elements describe a helix about the axis of the bed.

The butylenes feed stock, when brought into contact with the dehydrogenation catalyst, is dehydrogenated to form hydrogen and butadiene. The hydrogen will have a flow rate through the conversion zone 20 which is different from the flow rate of the butylenes feed stock and butadiene conversion product. As a consequence, hydrogen is separated from incremental portions of the butylenes feed stock and butadiene, as evolved, whereby a continuously changing equilibrium is maintained. Thus, the net equilibrium of the dehydrogenation reaction is shifted far to the right. As a consequence, high yields with good selectivity may be obtained at moderate conversion conditions whereby undesired side reactions such as hydrocracking may be avoided. Thus, for example, the conversion conditions in the zone 20 may include a temperature within the range of about 700° to about 800° F. and a pressure within the range of about 0 to 50 p.s.i.g. The rate of flow of the carrier fluid through the conversion zone 20 may be adjusted so that the contact time of the butylenes feed stock with the catalyst in the conversion zone 20 is within the range of 5 to 10 seconds. The rate of rotation of the feed distributor 36 should be such that the above-described helix pattern of flow of reactants through the conversion zone 20 is maintained. That is to say, with respect to a single tubular increment $\Delta x$ of the conversion zone 20, the flow pattern should be such that an initial increment (i.e., pulse or plug) of feed material, $\Delta y_1$, will have progressed through the entire length of the conversion zone without becoming admixed with components of a second pulse of feed material, $\Delta y_2$. Pulse components, $\Delta y_3$ and $\Delta y_4$, will similarly be spaced with respect to each other.

The effluent withdrawn from the shell 12 by way of the line 40 may be passed to any suitable separation means (not shown) for separating the carrier fluid from the conversion products and for separating conversion products and unreacted feed components from each other.

Having described my invention, what is claimed is:

1. A reactor for the catalytic conversion of fluent feed stock comprising spaced coaxial cylindrical wall members defining an annular conversion zone therebetween, means for supporting a bed of finely divided catalyst within said annular conversion zone, means for continually introducting a carrier fluid simultaneously into all incremental portions of said annular conversion zone, rotatable feed means terminating adjacent the top of said catalyst bed for continually introducing a feed stock to be converted into said reactor in a longitudinal flow direction for periodic contact with incremental portions of catalyst in said conversion zone, said feed means terminating transversely with respect to the axis of said cylindrical shell members whereby said feed stock passes through said bed in a helix path, and means for withdrawing said carrier fluid and conversion products from said reactor.

2. A reactor as in claim 1 wherein the feed means comprises a rotatable inlet line coaxial with said cylindrical wall members and a distributing arm forming the terminus of said feed means transversely positioned with respect to the axis of said cylindrical shell members, said distributing arm being fluidly interconnected with said rotatable inlet line and being provided with a plurality of discharge ports for discharging said material into said conversion zone on rotation of said inlet line.

3. A reactor for the catalytic conversion of fluent feed stock comprising spaced coaxial cylindrical wall members defining an annular conversion zone therebetween, means for supporting a bed of finely divided catalyst within said annular conversion zone, means for continually introducing a carrier fluid simultaneously into all incremental portions of said annular conversion zone, rotatable feed means terminating adjacent the top of said catalyst bed for continually introducing a feed stock to be converted into said reactor in a longitudinal flow direction for periodic contact with incremental portions of catalyst in said conversion zone, said feed means terminating transversely with respect to the axis of said cylindrical shell members whereby said feed stock passes through said bed in a helix path, and means for separately withdrawing selected components of the conversion products derived from said feed stock from said reactor.

References Cited in the file of this patent

UNITED STATES PATENTS

| | | |
|---|---|---|
| 293,747 | Hyatt | Feb. 19, 1884 |
| 2,351,835 | Pick | June 20, 1944 |
| 2,426,848 | Tuttle | Sept. 2, 1947 |
| 2,483,494 | Kleiber | Oct. 4, 1949 |